US008072954B2

(12) United States Patent
Shen et al.

(10) Patent No.: US 8,072,954 B2
(45) Date of Patent: Dec. 6, 2011

(54) MASHUP APPLICATION AND SERVICE FOR WIRELESS DEVICES

(75) Inventors: Guobin Shen, Beijing (CN); Yongguang Zhang, Beijing (CN); Songwu Lu, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 12/140,251

(22) Filed: Jun. 16, 2008

(65) Prior Publication Data

US 2009/0312033 A1 Dec. 17, 2009

(51) Int. Cl.
*H04W 4/00* (2009.01)
*H04W 24/00* (2009.01)
*G01S 1/00* (2006.01)

(52) U.S. Cl. ............ 370/338; 342/385; 455/456.1
(58) Field of Classification Search ............ 370/252, 370/338; 455/456.1; 701/50, 211
See application file for complete search history.

(56) References Cited

U.S. PATENT DOCUMENTS

| | | | |
|---|---|---|---|
| 6,968,179 B1 | 11/2005 | De Vries | |
| 7,212,827 B1* | 5/2007 | Veschl | 455/456.1 |
| 2005/0038876 A1 | 2/2005 | Chaudhuri | |
| 2005/0231425 A1* | 10/2005 | Coleman et al. | 342/385 |
| 2006/0052112 A1* | 3/2006 | Baussi et al. | 455/456.1 |
| 2006/0085419 A1 | 4/2006 | Rosen | |
| 2007/0032244 A1 | 2/2007 | Counts et al. | |
| 2007/0115868 A1 | 5/2007 | Chen et al. | |
| 2007/0244633 A1 | 10/2007 | Phillips et al. | |
| 2007/0255785 A1 | 11/2007 | Hayashi et al. | |
| 2007/0268864 A1 | 11/2007 | Mock et al. | |
| 2007/0271367 A1 | 11/2007 | Yardeni et al. | |
| 2007/0281689 A1 | 12/2007 | Altman et al. | |
| 2007/0282621 A1 | 12/2007 | Altman et al. | |
| 2008/0291855 A1* | 11/2008 | Bata et al. | 370/338 |
| 2010/0226284 A1* | 9/2010 | Bill | 370/254 |

FOREIGN PATENT DOCUMENTS

| | | |
|---|---|---|
| EP | 1294135 A1 | 3/2003 |
| JP | 2007-135016 A | 5/2007 |
| JP | 2008-027011 A | 2/2008 |

OTHER PUBLICATIONS

International Search Report and Written Opinion Received for PCT Application No. PCT/US2009/047575, mailed on Dec. 30, 2009, 11 pages.
Natchetoi, et al., "Mobile Web 2.0 Browser for Collaborative Social Networking", pp. 14, 2007.
Pietroniro, et al., "Map mashups and the rise of amateur cartographers and mapmakers", ACMLA Bulletin No. 127, pp. 26-30; 2007.
Chen, "Slam—Microsoft's Mobile Social Networking for Smartphones", Oct. 12, 2006, p. 1.

* cited by examiner

*Primary Examiner* — Steven H Nguyen
(74) *Attorney, Agent, or Firm* — L. Alan Collins; Collins & Collins Incorporated

(57) ABSTRACT

Described is a technology, such as implemented as social networking groupware application designed for mobile device users, that provides a data mashup service for various data types, including location dependent and mobility-aware data such as GPS location and surrounding maps. A mobile user may track the location and maps of roaming friends at runtime. To this end, a client device joins a squad of client devices that are each capable of communicating with one another over a wireless local area network (WLAN) connection. When in a squad, the client can obtain data for use as mashup information from other client devices in the squad over the WLAN connection (inter-squad). This may include intra-squad data that was obtained from a service based on information that the service received from another squad, e.g., over a WWAN connection.

18 Claims, 7 Drawing Sheets

MASHUP APPLICATION AND SERVICE FOR WIRELESS DEVICES

BACKGROUND

Friends and other related groups of people often want to be able to locate and track each other, as well as to possibly share information such as their current surroundings, sights, and feelings. For example, consider a large group of people together on a sightseeing tour or visiting a large amusement park. After arriving, they naturally break into subgroups (or squads), each with different interests and priorities, thus moving along different routes.

However, there is presently no reasonable way to locate, track and share data with one another in such squads, even though many people carry wireless communication devices such as Smartphones and the like. For example, while it is possible to call, leave a voice message, send a text message and so forth to another person, such existing solutions are not desirable or not as effective in certain circumstances. Wireless devices are subject to bandwidth limitations, require costly cellular data service, have battery power constraints, and have relatively small computational capacities. When combined with users' frequent location changes, there is heretofore no known way to perform cost-effective tracking and/or data sharing that overcomes the above-mentioned resource limitations, while maintaining data consistency for dynamic data.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a client device joins a squad of client devices that are each capable of communicating with one another over a wireless local area network (WLAN) connection. When in a squad, the client can obtain data for use as mashup (for combining data from different sources) information from at least one other client device in the squad over the WLAN connection, including data that was obtained from a service based on information that the server received from another squad, e.g., over a WWAN connection. In this manner, tracking and data sharing such as in a social network is efficiently performed by squads that exchange data over a WLAN connection (intra-squad), yet may include data received from another squad (inter-squad) for mashup purposes.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a social networking/groupware application designed for mobile device (e.g., Smartphone) users. In general, a "mashup" application is an application that combines data from more than one source; the technology described herein provides a data mashup service using various data types, including location-dependent and mobility-aware data such as GPS location and surrounding maps, in a timely and cost-effective fashion.

In one example implementation, the application exploits a social-networking guided, GPS-assisted sharing scheme to collaboratively share data in a cost-effective manner. The application also manages data consistency for roaming users through a mobility-adaptive and location-aware update policy.

While some of the examples described herein are directed towards a groupware application that enables a mobile telephone user to track the location and maps of his or her roaming friends, it is understood that these are only examples. Other potential uses include business applications to track personnel, delivery vehicles and so forth. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, communications, data sharing and consistency management in general, particularly in a highly mobile setting.

Figure 1:
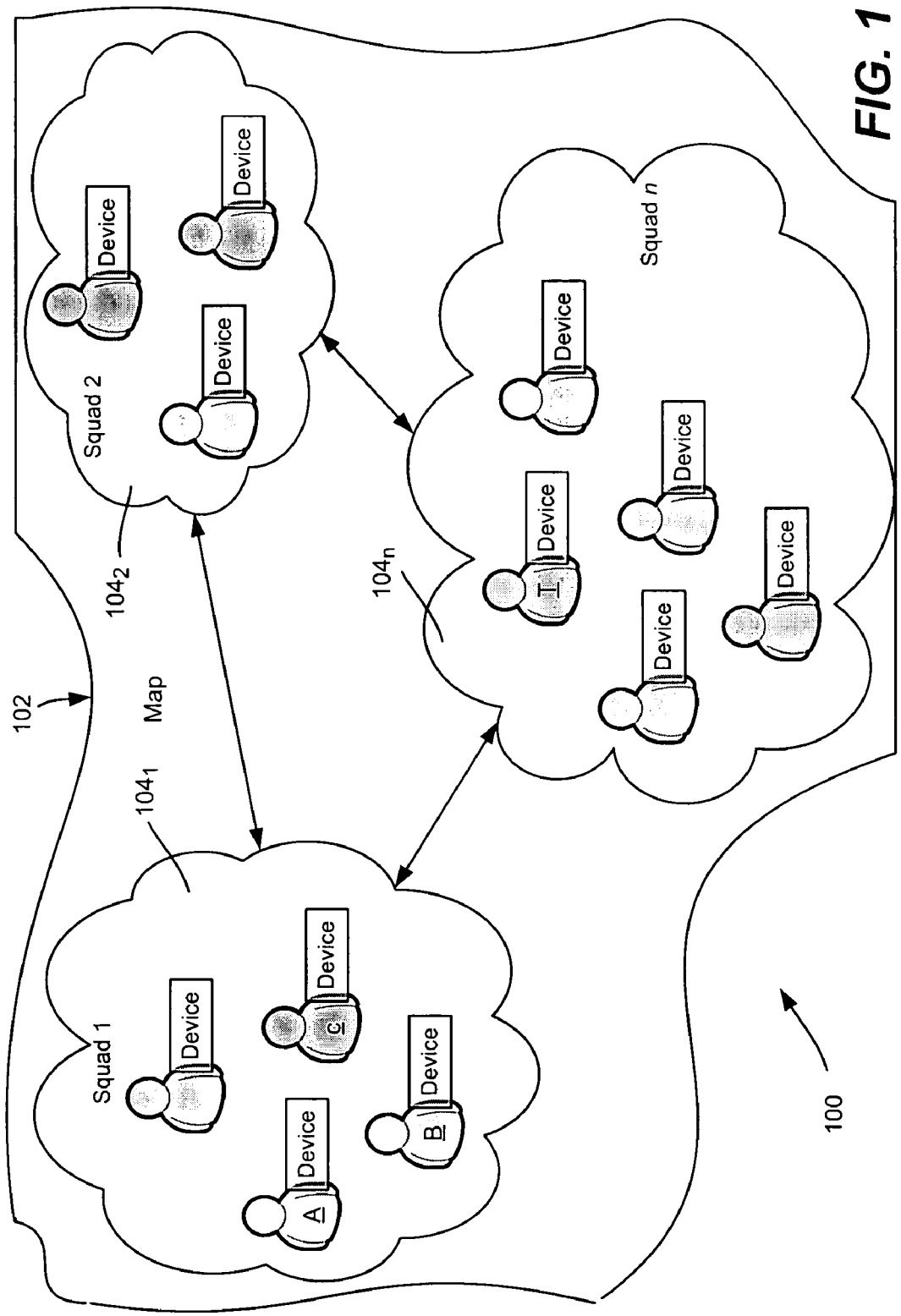
FIG. 1 is a representation of various squads of users on a map, such as produced by using a mashup of users' GPS data and map service data.

As generally represented in FIG. 1, there is shown a group of connected mobile users, referred to as a social network 100 (even though the relationships may not be "social"), including one or more users who wish to track their roaming friends or the like and/or to exchange various types of information with them in a timely fashion. Examples of real-life application scenarios that may benefit from such data exchange include daily activities, group outings (e.g., sightseeing, shopping, sporting events), and team missions (e.g., police, field work). Each user has a mobile device capable of operating with the application software described herein. The devices have location capabilities, whereby the users/devices may be considered as being within a map 102, e.g., by a mashup of user location data with data from a mapping service.

In general, people with strong social ties and/or common interests often move together as a geographically co-located squad. Multiple squads may roam in different directions at different speeds, and thus such squads are spatially spread out. A member may leave one squad to join another over time, although the switching frequency is not usually very high. A squad size may change dynamically, and squads may also merge or separate over time.

Thus, users tend to separate themselves into squads, as exemplified in FIG. 1 via squad 1 to squad n labeled $104_1$-$104_n$, respectively. A squad may be as little as one user/device/member, or any practical number of users/devices. Note that as used herein, the terms "user," "client," "device" and "member" are generally interchangeable.

Any practical number of squads may be communicating, and different groups of squads (e.g., associated with different groups of users) may be present in the same general area; it is feasible for one user to be in the squads of different social networks at the same time, such as by using group identities to distinguish between two sets of friends. However for purposes of simplicity, only the squads of one group are described herein.

As represented in the generalized hardware block diagram of FIG. 2 and the generalized software architecture diagram of FIG. 3 (described below), each participating user carries a mobile communication device 220 as an interface to a digital (e.g., social) networking environment, as described herein. The device 220 is capable of running certain mobile telephone software, and has a wide-area/coverage cellular data service such as GPRS/EDGE, CDMA1x, or 3G. As used herein, such wireless wide-area networking capacity is referred to as "WWAN" such as in "the WWAN connection" of the mobile communication device. Further, the device has short-range wireless networking capability such as through Bluetooth® or Wi-Fi, which is high bandwidth (relative to WWAN) and usually free. Such a short-range networking is referred to as "WLAN" herein, as in "the WLAN connection" of the mobile communication device.

Figure 2:
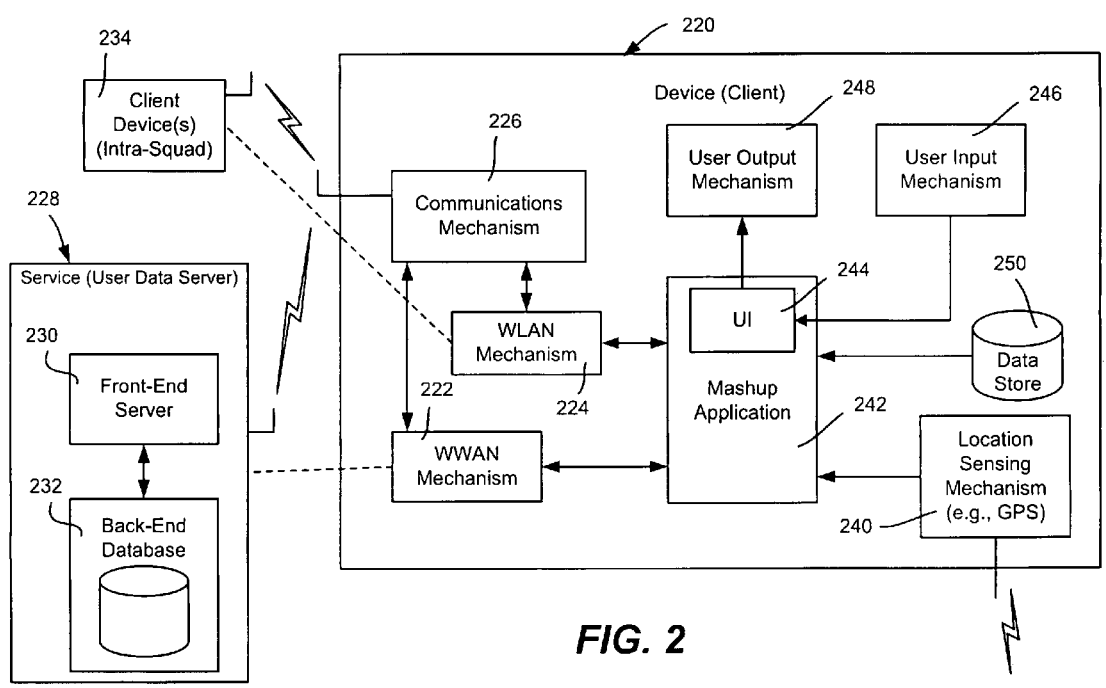
FIG. 2 is a block diagram representation of example components of a mobile client device, particularly hardware components that support a mashup application, communicating with intra-squad client devices and a service.

These device capabilities are represented in FIG. 2 by the WWAN mechanism 222 and WLAN mechanism 224, which are each coupled to a communications mechanism 226 representing additional communications software and/or hardware. As described below, the WWAN connection is to a service 228, which may comprise a user data server that includes a front-end server 230 and a back-end database 232. As also described below, the WLAN connection is to one or more other client devices 234 in the same squad (inter-squad) as the device 220.

Although the exemplified device has such wireless networking capabilities, it should be noted that not every device needs to have the same capabilities. For example, a mobile device such as a PDA or laptop computer need only have a WLAN connection to another device in its squad, as it can leverage that other device's GPS coordinates and/or its WWAN capabilities by exchanging appropriate data over the WLAN connection. However, for purposes of simplicity herein, each described device will include (at least) the capabilities described in FIG. 2.

In addition to networking, the exemplified device 220 includes location detection, capability, such as built-in or external GPS, or cellular-based service. This capability is represented in FIG. 1 by the location sensing mechanism 240.

As will be understood, the device runs an application 242 that provides a mashup mechanism and functionality for different data types coming from different sources. For example, user location coordinates are obtained from the mobile devices' GPS readings, or cell towers. Surrounding maps (e.g., aerial, road, traffic) are obtained from third-party online services (such as Microsoft® Virtual Earth). Note that some of the mashup functionality may be performed on a server, e.g., a server may provide fully or partially combined data to the application.

The user interacts with the mashup application 242, as represented by the user interface (UI component) 244, the user input mechanism 246 and the user output mechanism 248. For example, as represented by the data store 250 in FIG. 2, each user via the device 220 may be a source of text, photos, graphics and/or video clips which may be shared with friends and may be uploaded from the mobile device 220; (note that because wireless communications are often intermittent in nature, some of these data may be cached and stored in some online social networking data servers or the like, e.g., of the service 228). Thus, as used herein, the term "file content" refers to any such data, including text, images, graphics, audio and/or video, and so forth. The application 242 delivers such different data streams from different sources to a group of loosely-coupled users in a timely and cost-effective fashion.

Figure 7:
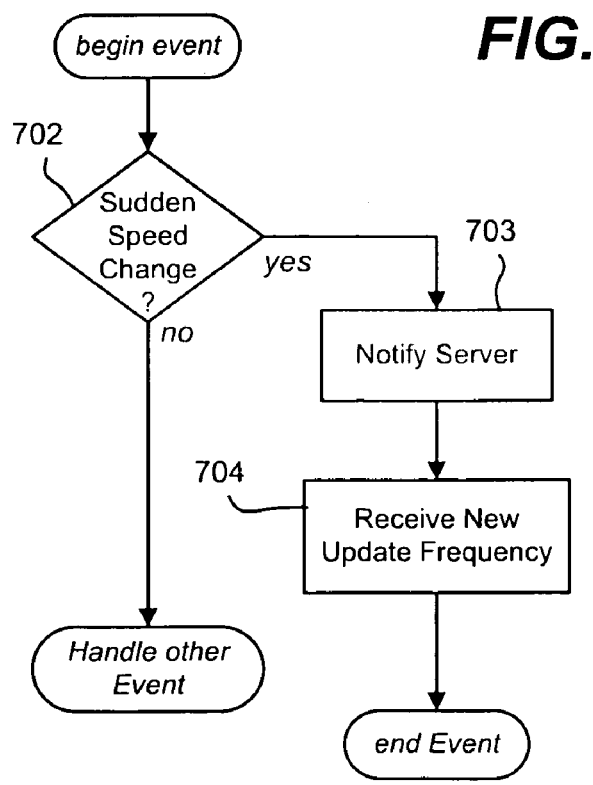
FIG. 7 is a flow diagram showing example steps a service/server may take when communicating with a client device.

Turning to an example implementation, one service 228 includes the user data server comprising a front-end web server 230, along with a back-end database 232 for storage and query handling. The web server 230 serves as the interface for communication with clients, e.g., through a stateless HTTP protocol. The back-end database 232 stores user data for replying to user queries. As described below with reference to FIG. 7, example functions performed by the service 228 include squad update frequency monitoring, squad/user location prediction and social graph computing. For example, the server may compute the current location of the user/squad under query based on a linear prediction model, e.g., current position equals the previous reported position plus the elapsed time times the reported velocity. For social graph computing, set intersection may be used to find common friends of users, with common neighbor based prediction offered to users who wish to establish new friends within a certain number of hops in their social graphs.

Figure 3:
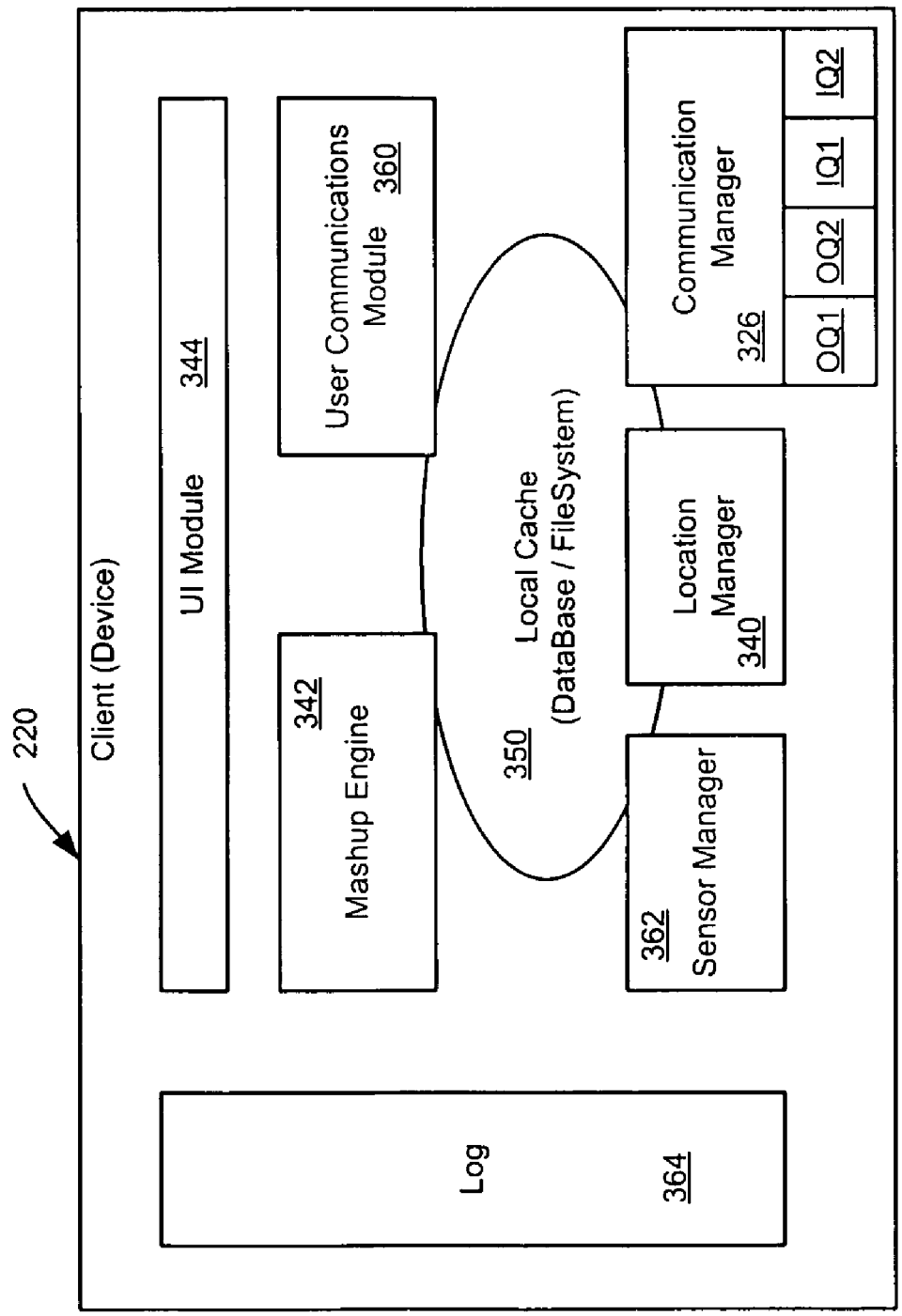
FIG. 3 is a block diagram representation of an example software component architecture of a mobile client device.

FIG. 3 shows an example high-level modular software architecture of the client device 220 in one implementation. The interaction between modules may be based on asynchronous request and callback-based reply model. Note that an exception is the recording of GPS time and location data, which may be periodically pulled, e.g., every two seconds.

The client device 220 includes a UI module 344 and a mashup engine 342 (e.g., as part of the mashup application 242 of FIG. 2). The client device 220 also includes a user communications module 360, a sensor manager 362, a location manager 340, a communication manager 326 and a log module 364. The UI module 344 implements the application interface and provides an entry point for user interaction. The mashup engine 342 is responsible for various mashup tasks such as blending various available data streams according to the current user view, and rendering the mashed up results to the user output mechanism 248, e.g., to a display screen. The mashup engine 342 initiates new requests and sends them to the communication manager 326 for any data that is desired but not available in the local cache 350.

To provide users with an integrated experience, the user communication module 360 is provided so that users can make phone calls or send SMS/MMS messages while inside the application. The database/local cache 350 records the user data (e.g., corresponding to the data store 250) including the current location and the readings of various sensors from the location manager 340 and/or sensor manager 362. The local cache 350 also stores indexes of cached map tiles (both downloaded and pre-fetched), e.g., represented by a range constrained bit vector data structure, as described below. The sensor manager 362 manages various device sensors such as a camera and microphone. Sensor readings may be tagged with instantaneous GPS time and location information when placed into the local cache 350. The location manager 340 retrieves the readings of the GPS device, manages the location and the historical trajectory of itself and those of other social neighbors.

The communication manager 326 handles the WWAN communications with various data servers (e.g, the map servers and other service data servers using GPRS/EDGE), and the WLAN communications with other intra-squad members, e.g., through Bluetooth®/WiFi interface.

In one implementation, the communication manager 326 operates two outgoing queues OQ1 and OQ2, namely one for remote server update using HTTP, such as status updates and text/image tags/blogs, and the other for local sharing using UDP for broadcast messages (e.g., heart-beating) and TCP for data retrieval (e.g., map tile transmission). The communication manager also operates two incoming queues IQ1 and IQ2; one is a ToHave queue that holds the indexes of map tiles to be fetched, and the other is a short queue for active ongoing WWAN and WLAN downloads. The communication manager 326 may use an SMS/MMS channel as an alternative WWAN communication means, such as when the GPRS channel is not available.

Returning to the example in FIG. 1, consider that in the Squad $102_1$, users A, B, and C (via their respective devices) want to keep track of the locations on corresponding maps of themselves as well as track movement of remote parties, such as the entire squad $102_2$ and an individual T roaming with Squad $102_n$. A, B, and C will need to regularly retrieve maps from a third-party online map service, as well as the GPS coordinates from Squad 3 and the individual T. As can be readily appreciated, each user A, B and C may separately obtain feeds of data through their WWAN interfaces, however this is likely not the best approach in terms of bandwidth consumption, download speed, and monetary cost.

However, users A, B, and C of the same squad likely have many shared interests, including that they desire information on common friends (Squad 3/individual T), as well as share overlapping map regions because they are moving relatively close together. To this end, collaborative sharing of data among them helps ease the resource-constraint problems and improve performance and user experience. To facilitate collaborative sharing, described herein is resolving who will share what information in the data mashup, and how.

Figure 4:
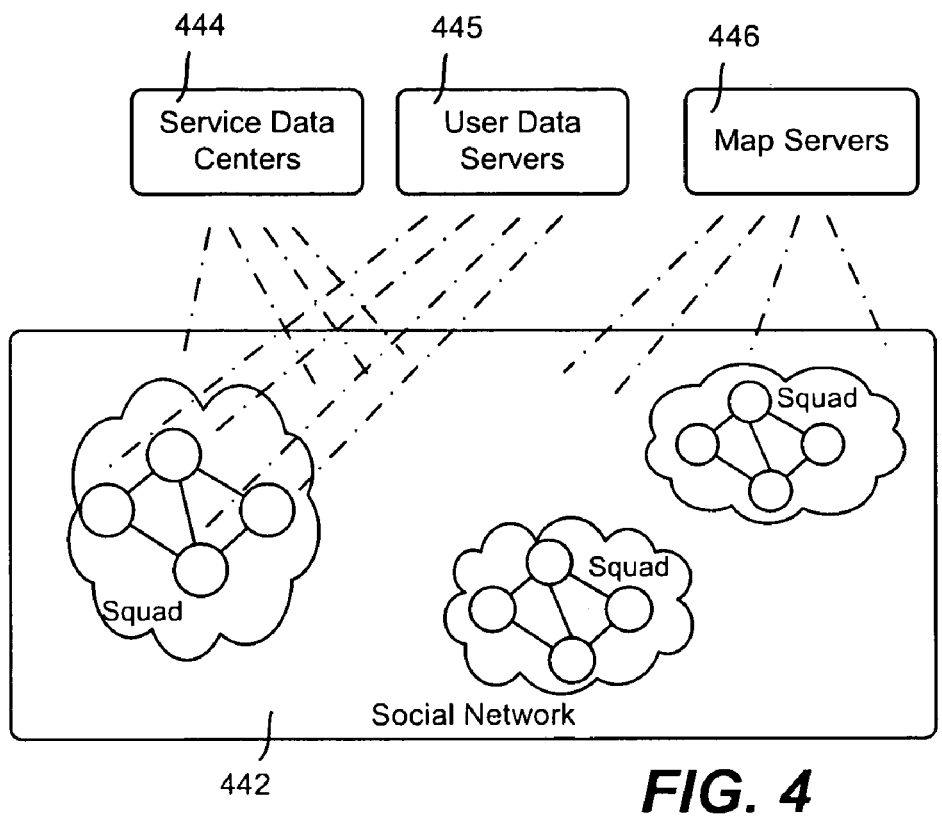
FIGS. 4 and 5 comprise a flow diagram showing example steps a client device may take when communicating with inter-squad devices and a service.

FIG. 4 illustrates an example system architecture for the application and service. Each mobile communication device (client) of a social network 442 interacts with multiple servers 444-446 via its WWAN link. Each server may provide current data, for example, map tiles, photos, text tags, and blogs which may be mashed together. Further, local clients within each sharing group may also perform local sharing with one another via the local WLAN link. A general flow of data between a client and the data servers includes the user data server 445 serving as a communication and storage bridge between different clients, e.g., the server hosts current and historical data for each mobile user. A mobile client may periodically or otherwise upload its current GPS measurement results, e.g., two- or three-dimensional GPS coordinates and a GPS timestamp, and other location-dependent data such as geotags at random instants to the server, which subsequently stores such data.

When other clients are interested in the mobile client's status, those clients may download such information appropriately mash it up together, such as with matching road/aerial/weather/traffic maps downloaded from other relevant data servers. The mashup data is then suitably rendered on each involved mobile communication device.

In one example implementation, the application attempts to facilitate efficient sharing of data among mobile users, using a sharing solution described herein based on a social networking-guided and GPS-assisted collaborative sharing aspects that leverages features of location dependency and social networking connections among mobile users. For example, users within a geographic proximity to one another (through the server guidance and GPS-assistance) form a sharing squad to collaboratively download the local map data, aggregate runtime data from each client and upload such data to the user data server. Moreover, if users are interested in mashing up data from common other users, e.g., resulting from similar social ties, they may collectively download their data, which effectively reduces the transmission of redundant copies of same data between the (relatively low bandwidth) user data server and geographically co-located clients.

A user may also "loan" the WWAN link to other squad members when the link is idle and others have a downloading demand. Moreover, the social networking-guided and GPS assisted sharing scheme can be accomplished via communication and computation aspects, e.g., one device may perform computations (as well as communications) on behalf of one or more other devices. As a result, the application described herein enables both communication and computational sharing, thereby reducing the overall resources consumed at each mobile communication device.

Further, the application and service may perform data consistency management to handle the rapid data changes (e.g., in both GPS coordinates and maps) associated with mobile users. One exemplified consistency management scheme is location-dependent as well as mobility-adaptive, e.g., as the mobility speed of a user or a squad changes, the data update frequency also changes accordingly so that the data refreshing process is adaptive to the user mobility. In general, the application seeks to keep the spatial, logical relations between users intact at a reasonably low cost.

To enable effective mashup service of different data types, the application may exploit the inherent semantics of each data type and between types. The built-in tree structure of map tiles has been used to enable efficient sharing of the map data among local users. The matching relation between a GPS location and the relevant map is also exploited to enable predictive downloading of target map data among local users.

As will be understood, the application and service thus collaboratively transmits and downloads different data streams and preserves data consistency among mobile users over resource-constrained mobile communication devices. Such tasks are accomplished by exploiting the social networking connections, location dependence, and mobility awareness among roaming users.

To this end, in one example implementation, the application and service allows mobile users to collaboratively share data of common interest. At a high level, the user data server 445 coordinates data transmission and sharing among different squads via the WWAN links. More particularly, each squad transmits data records to the data server 445 via WWAN, such as periodically every T1 seconds, which consequently logs the latest data records. The data records stored at the server 445 are also shared among members within a squad.

At a lower level, members within a squad generally use their local WLAN links to share data with one another. This local ad hoc sharing may occur whenever a single data copy of interest is downloaded to a squad member. The local sharing may be synchronized to increase power saving at each device, e.g., each member wakes up its WLAN interface for a time slice within a suitable time interval to conduct data sharing.

That is, the periodic (or other timed) wakeup is synchronized in time among members in the local squad, and each device will turn off its WLAN during other times to save energy.

The above higher-tier approach of server-based sharing via WWAN links, rather than the option of purely ad-hoc sharing via WLAN links, is employed for several reasons. For one, different squads may not be able to connect each other via the relatively short-range WLAN interfaces. Therefore, communication via GPRS is the only feasible solution to this case. For another, the WLAN interface on a mobile communication device may not be always turned on in typical real-life scenarios. As yet another reason, since the data server stores and aggregates data as well as per-user status information, it is reasonable to perform certain centralized processing (e.g., computing the social friend graph) to improve efficiency over the fully distributed approach.

The low-level ad-hoc sharing via WLAN is used whenever possible. Compared with sharing via GPRS, the local sharing via WLAN is more efficient in terms of consumed energy per bit and transmission time used. In addition, WLAN is (typically) free while transmission over GPRS can be costly.

The application and service use squad-based sharing that offers a social-spatial-temporal sharing scheme for mobile users. Mobile users form a sharing squad when satisfying certain conditions, e.g., they are socially connected, they are within geographic proximity and connected via WLAN links and each user has sufficient resources.

With respect to resources, a client may accept or decline collaboration requests within the squad. Resource availability may consider various factors, including wireless connection quality, e.g., whether the wireless transmission is of high quality or not, memory, e.g., the storage load of data in the client device, and energy, e.g., whether the client mobile communication device has enough remaining battery power.

With respect to social connections, each squad in the application and service is formed using social connections among members. The social relations among members may be managed at startup, e.g., when a new user starts the application, the user specifies social connections via a "friends list" or the like. Such a list may be recorded at the user data server when the user registers with the server, e.g., during a boot-up phase. Because the data server has the social friends lists for any registered user, the server can readily derive a social graph or the like for registered users, e.g., in which a node denotes a user and an edge indicates a direct friendship or contact.

Given such a social graph, a client is socially connected if it is a direct neighbor with another client, or possibly an indirect relationship up to some level of edges, e.g., shares a common client in the social graph with other members. The concept of socially connected members provides for collaboration among members, and tends to reduce potential security or privacy concerns for sharing; a user may configure a custom membership, e.g., by including or excluding certain others users, setting a number of levels of indirect neighbors allowed, and so forth.

With respect to GPS-assisted spatial sharing, besides social connections, squad-based sharing is assisted by GPS information. For example, synchronized wakeup and sharing via WLAN may be based on GPS because GPS provides an effective method to synchronize client devices in a squad. More particularly, the GPS timestamp may be used as time data to synchronize all clients in a squad, whereby clients wake up their WLAN interfaces simultaneously to share.

Moreover, geographic proximity can be readily determined with GPS assistance, that is, to establish how geographically spread out each squad is. Given the location coordinates of each user, the server may compute the distance between any pair of users. This distance may be compare with a given and pre-specified threshold value (e.g., chosen as the WLAN communication range or a multiple of this range) that defines the geo-proximity.

Still further, GPS information may provide a rapid way for WLAN connectivity testing without actually turning on a wireless interface, which saves battery power. For example, this may be accomplished by comparing the separation distance versus the maximum communication range; note that two nodes that are within the WLAN communication range may not have connectivity due to interference or poor reception and so forth, however, GPS data may still help to filter out clearly ineligible devices.

The application and service also exploit temporal sharing techniques to improve sharing efficiency, including caching and help from idle devices. The caching technique allows a client to help others with contents that have already been downloaded and cached in the device. Client status aggregation also belongs in this category, that is, the location and state information of each client is aggregated over each period and sent to the data server.

To exploit device idling, an idle device may be able and willing to help others to download certain data content (e.g., some map tiles from the online map server) although it does not need the content itself. This may be particularly helpful when other clients encounter WWAN disconnection problems, and/or when some clients need to pay for WWAN connectivity and another client does not.

Turning to an explanation of general operation in one example implementation, as generally represented in the flow diagrams of FIGS. 5-8, a mobile client registers its social friends list with the user data service via WWAN (step 502 of FIG. 5), e.g., during a bootup phase. In response, the data server updates its social graph and replies with a list of other active social neighbors, (steps 802 and 804 of FIG. 8), together with their squad IDs (SquadID) and locations.

Figure 5:
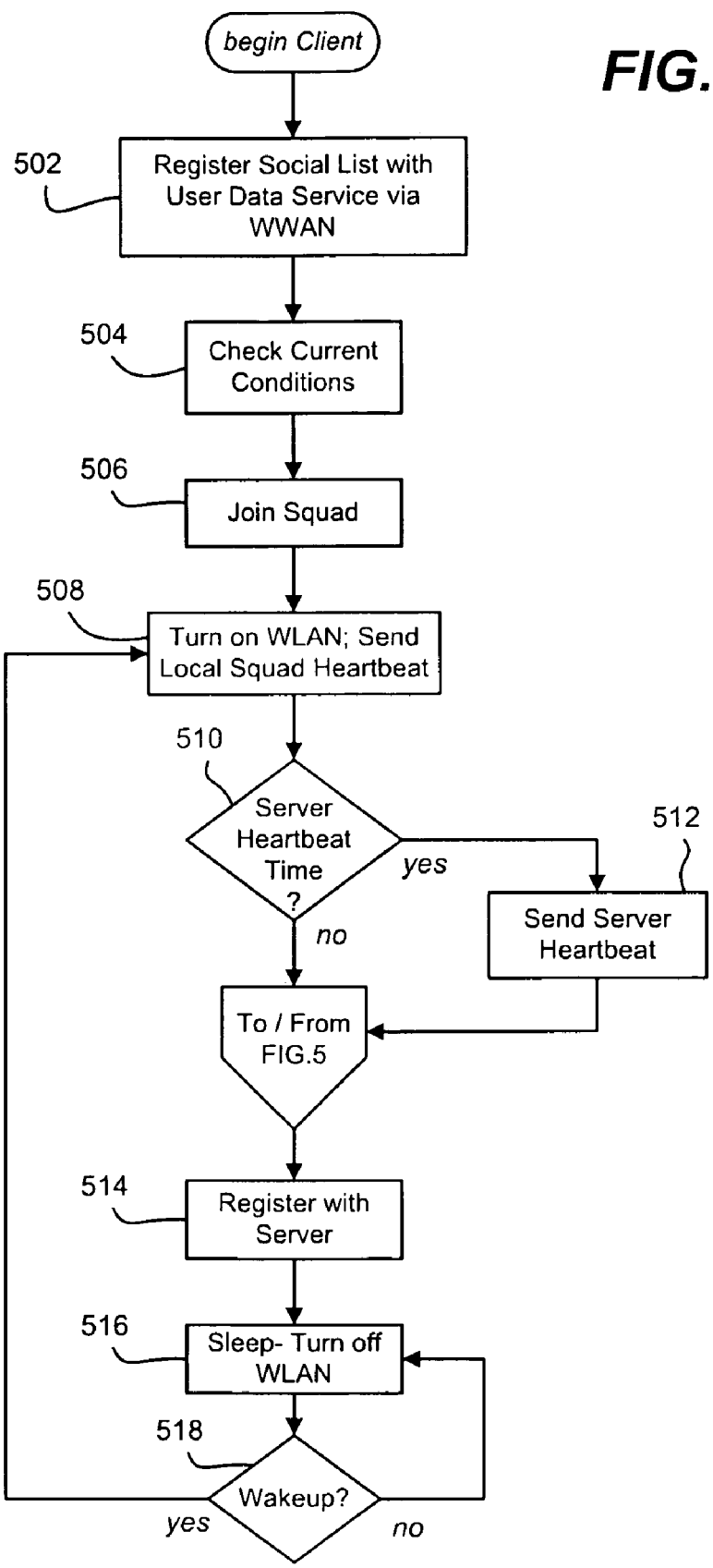
Figure 6:
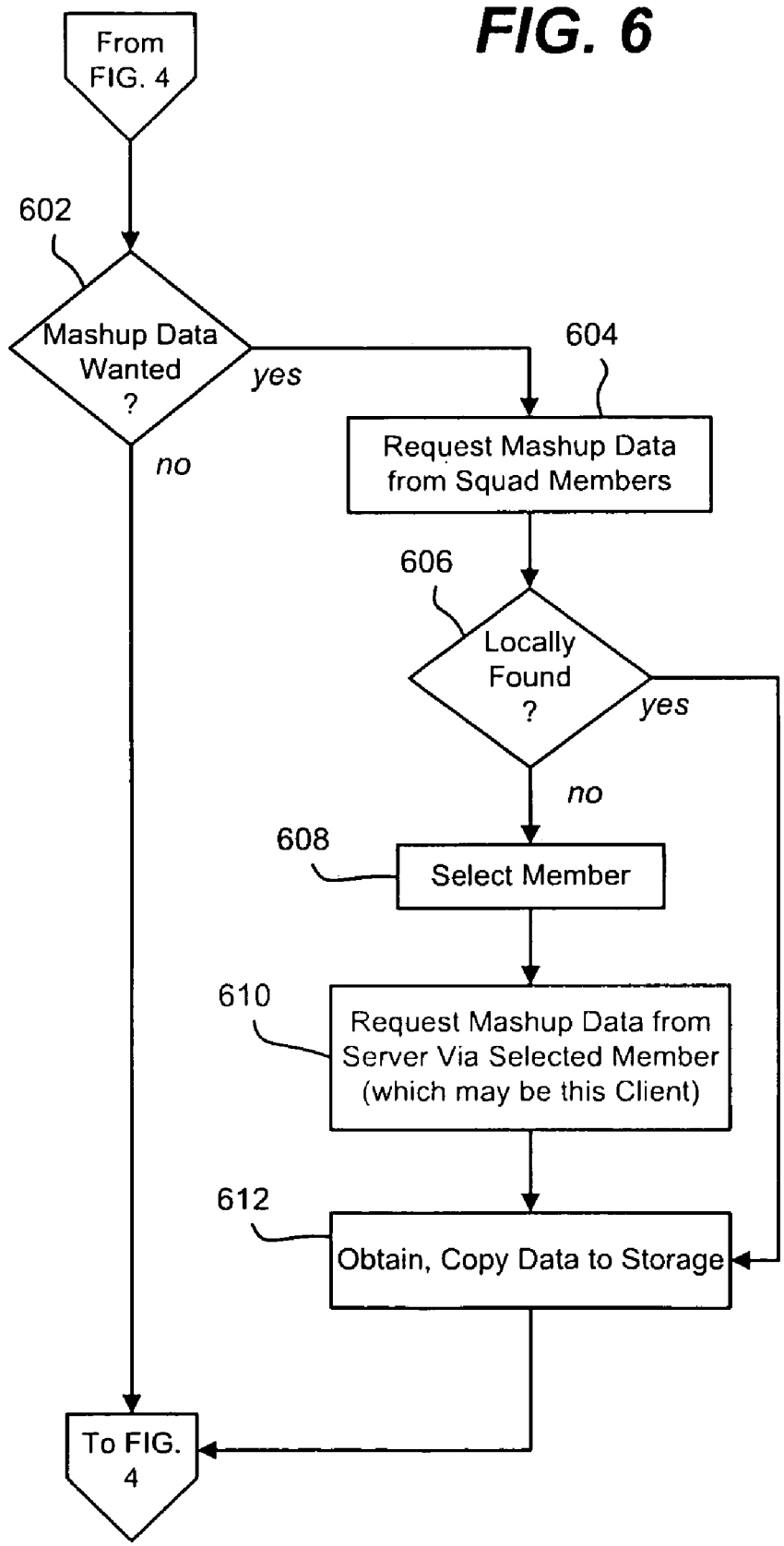
FIG. 6 is a flow diagram showing example steps a client device may take when detecting a mobility event (exemplified as a sudden speed change).
Figure 8:
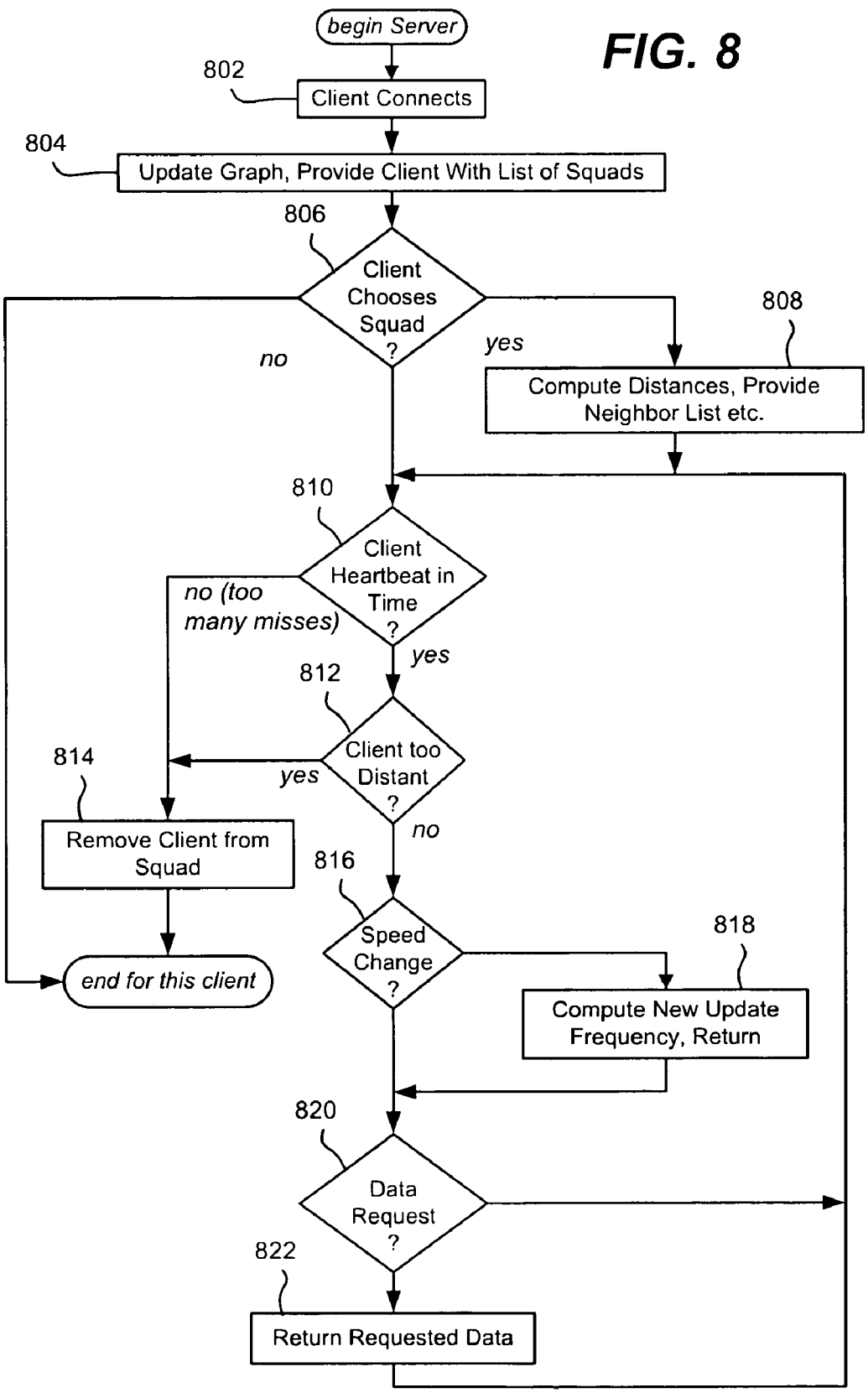
FIG. 8 is a flow diagram showing example steps a client device may take while in operation.

As represented via steps 504 and 506 of FIG. 5, the mobile client then selects a proper SquadID to join, such as after checking current conditions, including social connections, proximity and/or available resources, which may be automatic. A client is considered active when the client refreshes with the server via regular heartbeats or the like (FIG. 5, step 512; FIG. 8, step 810); a client is inactive when the server misses such updates for some number of (e.g., five) consecutive periods, whereby the client may be removed from the squad (step 814). A client may also be removed from the squad if it is determined to be too distant from the squad (step 812).

In one implementation, a SquadID is a service-unique identifier for each sharing squad, which may also serve as the SSID of the local ad hoc network. When the user requests a latest data mashup on other clients, such as at regular intervals, the application first checks whether another member in the client's squad already has the same data or a cached copy, as represented by steps 602 and 604 of FIG. 6. Note that the data may be mashed up from different copies, e.g., an application may be seeking a mashup of data XYZ, and one or more other devices may have X, Y and Z (or XY, XZ or YZ) as separate data rather than mashed up; the application or another device can mash up X, Y and/or Z as appropriate to avoid needing to downloading all these sets of data.

If some or all of the needed data is not available among the squad devices (step 606), a member in the local squad is selected (step 608) to retrieve the data from the servers (step 610; note that multiple members may be selected to retrieve component parts of the data; for purposes of simplicity, one member is selected in this example). Selection may be performed via a distributed backoff-based solution, e.g., where the backoff value at each client is set as a function of resource availability and recent download frequencies. Cost may also be a factor in determining the backoff value, e.g., free download has a smaller backoff score than paid download.

In this example, the member device with smallest backoff value is selected to download the data, (which may be the client that wants the data in the first place). Other members abort transmissions, because each squad is limited to a one-hop communication range. As described herein, the data transmissions in each squad are synchronized among clients via GPS timestamps during regular wakeup periods. Once the data is available to the squad, the requesting member or members may copy it to their own storage (step 612), process it, and so forth.

The management of each squad is done via a periodic heart-beating mechanism which handles dynamic membership as members enter and leave a squad. More particularly, management is performed among local squad members and with the user data server, via a local heartbeat and a remote heartbeat, respectively. As generally represented by step 508 of FIG. 5, each client periodically turns on its WLAN interface and broadcasts a local heartbeat message. The period is set as T0 (e.g., every ten seconds in one implementation). Each squad also regularly communicates a remote heartbeat message with the user data server, e.g., with the period T1 for remote heartbeat (to the data server) set as a multiple of T0 in general, such as one minute, as represented via steps 510 and 512. The updating period also may be made adaptive based on data consistency management policies described below.

The application enables sharing of different data types, such as text, image, and photos, and so forth, while attempting to improve sharing efficiency of location-dependent data types, including the GPS location data and the corresponding maps. To this end, when applicable, data aggregation is used, along with exploiting the inherent structure/semantics of a given data type.

With respect to map semantics, most maps from online map servers correspond to structures that can be exploited in design. For example, Microsoft® Virtual Earth supports three types of maps, namely a road map, an aerial map and a hybrid map, along with other special purpose "informative" maps such as traffic maps, weather maps and so forth. The map tiles are of the same size, 256×256 (or 128×128) in pixels. Depending on their coverage, tiles are organized into different levels (or layers) with the top level having four tiles; there are up to nineteen levels. Tiles at different levels are calibrated such that each parent tile at a lower level covers the same area of the four children tiles at the next higher level. With this regular layout of the map tile content, Virtual Earth adopts a highly-regular naming convention call Quadkey, in which the name of any tile is the catenation of the quadkey values of itself and its parent tiles until the top level is reached. Such naming semantics allows a tile to be uniquely calculated given the position and the level parameters. This is a basis to relate the position data and the map data. The naming semantics also allow tiles to be organized in any specific level into a prefix quadtree, where the prefix is the name of the parent title and is also the longest common part of the four sibling tiles under the same parent tile.

Based on the key observation that users tend to download continuous spans of map tiles in any level, a range constrained bit vector (RCBV) may be used to efficiently index map tiles at any given level. In RCBV, 'range' refers to the naming of tiles but not the geographical coverage, even though the two can map to one another through simple position-to-tile translation. The range constraint is expressed using the prefix value; given a set of tiles at a specific level, e.g., k, the range constraint is depicted by their longest common prefix $P_l$ with l (l<=k) being the length of the prefix, i.e., $|P_l|=l$. $P_l$ should have in full $4^{k-l}$ successor tiles, which is usually not the case. To represent what tiles are given, a bit vector $V_B$ is used to achieve this, in which each bit in $V_B$ corresponds a tile in the range depicted by $P_l$. Therefore, the length of $V_B$ is also $4^{k-l}$, i.e., $|V_B|=4^{k-l}$. The bit-to-tile mapping is achieved using a breadth-first traversal of the subtree rooted at $P_l$. Note that the same prefix will cover different range (i.e., the number of tiles) for different levels and therefore is meaningful only if accompanied by the level; therefore, the overall RCBV structure is a (level k, prefix $P_l$, $V_B$) tuple and map tiles are represented using a list of RCBV structures. The level k is not redundant since it may be more economical to represent a set of tiles using more than one bit vector with more refined ranges, particularly when a user is interested in locations that are geographically far away.

The RCBV tile representation enables efficient querying. String matching and tile enumerations are almost completely removed. The only string matching used is to identify a certain prefix exist or not, which is further avoided by using a hash table or the like.

Data aggregation is used on both data types of map and GPS location. For map data, the RCBV tile representation enables very effective aggregation, e.g., using a bitwise OR operation. A response to a collaborative query can be fulfilled with a simple bitwise AND operation. By way of example, suppose client A has tiles represented $V_B^A=$ [1001011110010111] for certain level and prefix, and client B desires tiles depicted by $V_B^B=$[0101011001010110] for the same level and prefix. Then, instead of comparing the name of each existing tiles, A simply replies with $V_B^A \cap V_B^B=$ [0001011000010110]. If represents A's desired tiles, then $V_B^A \cap V_B^B=$[1101011111010111] is the aggregation of desired tiles.

The GPS location coordinates of each user will also be aggregated before sending to the user data server. This is done by aggregating the data at a chosen coordinator of the squad, with the coordinator transmitting the aggregate GPS report to the server. The coordinator may be chosen in a fully distributed way via the backoff mechanism.

Another issue is user mobility, including micro-mobility within a squad (e.g., users join/leave the squad over time), and macro-mobility among squads (e.g., roaming squads merge/split). The high-tier, server-based aspect of the technology helps to decouple the management of these situations. For example, the impact of macro-mobility is mostly absorbed at the server, which performs event-driven reexamination of local clients' common social neighbors and informs affected clients. As users do not change their interested social friends frequently, macro-mobility mainly leads to the change of map levels if local clients intend to display a remote squad completely on the screen.

With respect to micro-mobility, soft-state based, best-effort squad membership maintenance may be performed in which no consistent squad-wise knowledge (e.g., topology and/or each member's status) needs to be obtained. Instead, each client makes local sharing decisions according to its own knowledge on its direct neighbors.

To provide support for power-saving operations, note that the GPS receiver and the WLAN interface consume energy. A client saves power by sleeping, however a client enters into the sleeping mode only when it does not have pending tasks and believes that its trajectory and status are highly predictable. Before entering the sleep mode, a client registers with the user data server (steps 514 and 516 of FIG. 5), which subsequently notifies relevant social friends and other squad members of this mode change. Any status information during the sleeping period is marked as "predicted." The client may randomly wake up (step 518, which also represents synchronized wakeup) and update the server and/or other squad members during the power-saving operation.

Computational sharing is another aspect, generally described in U.S. Published Patent Application no. 2006/0269147. In general, computational sharing may be done using social networking guidance and GPS assistance, similar to the communication sharing scheme described above. Computation sharing may be achieved by sharing of meta-info generated by clients instead of directly sharing of the decoded images; as describe herein, such meta-information is generated once, for multiple clients. By adding meta-information to an original JPEG file in a syntax compatible way, computational sharing goes with the file.

In general, given a popular size of map tiles of 256×256 pixels and a current mainstream screen size of QVGA (320× 240 pixels), a client needs to decode multiple tiles to make a full screen display; depending on its position, two to six tiles may be required.

To avoid wasted decoding and improve user experience, only the needed part of each related tile is decoded. This is facilitated by jumping to any part of an image in the compressed domain and perform decoding from there. However, due to the variable length entropy encoding technique used in JPEG compression and the differential coding of DC components between neighboring coding blocks, normally decoding has to be from the beginning.

The exemplified application may instead decode based on auxiliary "indexing" data within meta-information. In one implementation, such meta-information includes a block length map (BL-map) and a DC map (DCmap) that capture the start positions (in bits) and DC values of the MCUs (minimum coding unit, which is usually an 8×8 block) in the image, respectively. Both BLmap and DC-map are linear arrays with elements arranged in the same order at which MCUs are encoded. With meta-information available, on-demand partial decoding may be performed. This scheme is referred to meta-info aided on-demand partial (MOP) decoding.

For MOP decoding to be effective, the overhead of meta-information needs to be small, for both the generating time and the size, and data needs to be easy to share with others. For small meta-information a fast bit stream filtering process that performs only semi-bitstream parsing is provided, that is, only the length (in bits) of code symbols (i.e., (run, value) tuples in JPEG) is extracted instead of their concrete values. Customized Huffman tables handle multiple tuples with a single table lookup. The fast filtering process is further pipelined to the map tile downloading process, i.e., instead of waiting for the whole tile being downloaded, meta-information generation is started as data packets, which may be parts of an image, flow in. Because of the fast semi-bitstream process, the meta-info generation may be almost completely hidden by the downloading process, even in the case of synchronizing images from a desktop using ActiveSync in a LAN environment. A simple fixed-length differential coding method is used to reduce the size of the BL-map and the DC-map.

For sharing, the syntax flexibility of JPEG is leveraged, embedding the meta-information into some reserved application data segments (APPs). The resulting image is fully standard compatible, with original image bits remaining intact. When sharing the image with other devices, the computational savings goes with the file and avoids other management efforts that otherwise occur when the meta-information is stored in a separate companion file.

Turning to data consistency management aspects, the application and service preserves spatial ordering among squads and between squad members. While the physical distance between two parties may not be refreshed on time to lower the update cost, their ahead/behind ordering relationship in space may be correctly retained.

Various data consistency management scenarios include inter-squad ordering, which is when a squad suddenly changes its roaming speed and leads to changes of relative distance and positioning among squads; intra-squad spatial ordering, including when the spatial ordering (e.g., front-rear relationship) of any two users within a squad changes due to mobility and/or the relative positioning of the given roaming members is not changed, but their spatial ordering is violated in the data records due to asynchronous updates of their current positions. Another scenario relates to asynchrony between update and query, that is, when users are mobile, the location records stored at the server will not reflect the actual position of a user when a new query comes in.

To address the potential inconsistency caused in the above scenarios, intra-squad and inter-squad level approaches are used, in the form of techniques that are mobility adaptive and location aware. To this end, whenever a roaming user detects sudden and non-negligible change in mobility speed, the device notifies the user server. This is generally represented by steps 702-704 of FIG. 7, (which also exemplifies any other such event/server notification handling). The user server (via steps 816 and 818) then re-computes the desired update frequency based on a consistency policy, and specifies the new update period to the relevant squad. The squad then refreshes the server according to this update period.

To retain location consistency of members within a squad, consider that a common friend may be interested in tracking the current positioning of certain members. A local coordinated update within a squad handles when spatial ordering is violated due to asynchronous updates; to this end during each update period, the squad is required to notify the data server of the latest status vector that contains time, position and velocity. The squad is only allowed to upload once with a single update message. The message aggregates the status vector of each squad member. This effectively eliminates any inconsistency issue caused by multiple individual updates by several members within each period.

To handle spatial ordering changes due to mobility, an event-driven approach is used. Each roaming squad regularly computes the position and velocity of its centroid. A vector (i.e., location and roaming speed) of the centroid is used to represent the mobility pattern of the squad. The squad coordinator uses this vector to record the recent history of squad mobility. When any squad member suddenly changes its roaming speed beyond a pre-specified threshold, the device notifies of its mobility speed change. The coordinator subsequently uses a projection method to assess the relative spatial ordering of different squad members, e.g., the two-dimensional position of each member is projected onto the squad vector. The projected values of members are used to assess their relative ordering. Whenever any change is detected, the coordinator sends an update message to the user server to retain the spatial ordering of members within a squad.

Inter-squad consistency is handled via a mobility-adaptive and location-aware update policy, that is, to handle consistency among multiple roaming squads. When a squad suddenly changes its mobility speed (again defined with respect to its centroid) beyond a tolerable threshold, the squad immediately updates the user data server with a status report. The server computes a new update frequency (which is upper bounded by a maximum value), and sends it to the squad. The squad starts to send updates at a period of one times this frequency. The update frequency is set to be in proportion to the squad mobility speed when the squad is at least beyond a given distance from any other roaming squad. When this squad roams within that distance from another squad and thus may incur an inter-squad spatial ordering change, the squad starts to send updates at the maximum frequency for an interval. To quickly capture the relative positioning change between two squads, the data is refreshed at the highest frequency. However, if the relative positioning does not change within the interval at the highest frequency, the update frequency is reset to again be in proportion to the squad mobility. This accounts for a situation case in which two squads merge, and will not lead to any changes in spatial ordering afterwards.

To address inconsistency between updates and query for mobile users, note that users may query the status of other squads or their members at a time that is different from the status update time. Because of such asynchronous updates among different squads, the location data copy stored at the server may not reflect the current position of the interested parties that are roaming over time. This type of inconsistency is resolved using a server prediction-based technique. More particularly, the user uses the snapshot data of the interested party plus the estimated roaming speed to predict the current location of the interested party. The snapshot data reflects the location of the party at the update time; the predicted value takes into account the roaming effect between the query and the snapshot. The estimated roaming speed is taken as the value of the squad rather than an individual user's speed in one implementation, because the squad speed tends to be more stable over time.

Additional example implementation details relate to the data structures. More particularly, in addition to a client's own status information (STAT), a client also maintains a local neighbor list, a social neighbor list, and the Having queue and the ToHave queue for map tile representation and management. The local neighbor list comprises a list of other squad members that are in the reach of the local communication interface. The list may be sorted according to the collaboration history, e.g., with the preference of recentness and frequency. The social neighbor list is a list of remote social neighbors (either individuals or squads) in which the user is interested; this list also may be sorted, such as according to the commonness among the local neighbors after local information exchanges.

The Having queue and the ToHave queue are two concrete embodiments of the RCBV data structure. The Having queue maintains the indexes of already downloaded and local cached map tiles. The ToHave queue holds the indexes of those to be downloaded. In their RCBV representations, a '1'-bit in the bit vector indicates that the corresponding tile is available and desired. For efficient (range) query answering, hash table lookup for prefix matching is used, which, together with the range constrained bit vector, avoids string matching and ensures decision speed.

In one implementation, the elements of the BL-map are differentially coded using fixed length coding for space efficiency and simplicity. A k-bit unsigned integer is used (due to the monotony of the start positions of consecutive MCUs) for better space efficiency where k is determined using the following empirical formula.

$$k = \left\lceil \log_2\left(\frac{\text{file\_size} \times (\text{grid\_size})}{\text{area}}\right) \right\rceil$$

where file size is the tile file size in bits and grid size and area are expressed in pixels.

The value k is signaled using one byte preceding block length map segment. An escape coding technique handles exceptional MCUs that are more than 2 k bits long. The DC values are handled similarly but using a fixed 6-bit signed integer. The meta-info is stored in the reserved application data segment (APP) field of JPEG format. While any APP segments can be used, APP3 is chosen in one implementation. The ASCII codes for 'DCMD' and 'BLMD' for DC-map data and BL-map data, respectively, are used for the applications to identify the map and also to make this design immunized from other applications that may coincidentally use the APP3 marker segment for other purposes. Note also, the length of fixed code k is carried in the "Bits per BL symbol" field in the APP3 marker segment for BL-map.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
joining, by a client device, a squad of client devices that are configured for communicating with one another over a wireless local-area network (WLAN) connection;
obtaining, by the joined client device, data mashup from at least one other client device in the squad, wherein at least a portion of the obtained data mashup was previously obtained by the at least one other client device from a third-party service, and wherein the at least a portion of the obtained data mashup is based on information that the third-party service previously received from another squad, wherein the obtaining the data mashup comprises obtaining location data and map data that was previously mashed up.

2. The method of claim 1 wherein the obtaining the data mashup comprises communicating with the at least one other client device in the squad via the WLAN connection, and wherein the at least a portion of the obtained data mashup was previously obtained from the third-party service by the at least one other client device over a wireless wide-area network (WWAN) connection.

3. The method of claim 1 wherein the obtaining the data mash comprises receiving file content.

4. The method of claim 1 further comprising, communicating heartbeat information to the squad, and communicating heartbeat information to the third-party service.

5. The method of claim 1 further comprising, selecting a member of the squad to communicate with the third-party service.

6. The method of claim 1 further comprising, temporarily turning off the WLAN connection to enter a sleep mode between intra-squad communications.

7. The method of claim 6 further comprising, using location data received from the squad to synchronize the sleep mode with at least one other device of the squad.

8. The method of claim 1 further comprising, reporting information corresponding to a detected change in mobility to the third-party service.

9. The method of claim 1 further comprising, mathematically combining location data of at least some of the clients of the squad, and reporting combined location data for the squad to the third-party service.

10. The method of claim 9 further comprising receiving an update frequency from the third-party service, and using the update frequency to provide the combined location data for the squad to the third-party service.

11. In a computing environment having clients coupled to a third-party service, a system comprising, a client device that is a member of a local squad of client devices, the client device including a mashup engine configured to combine data obtained from different sources to provide data mash that includes a set of data obtained via a wireless local-area network (WLAN) connection with another client device of the local squad, wherein the another client device previously received at least a portion of the set of data from another squad via a wireless wide-area network (WWAN) connection from the third-party service.

12. The system of claim 11 wherein the WLAN connection comprises a Wi-Fi or Bluetooth® connection.

13. The system of claim 11 wherein the client device further includes a communications manager configured for handling local communications via the WLAN and remote communications via the WWAN, and for managing incoming and outgoing data queues.

14. The system of claim 11 wherein the client device further includes a location manager coupled to the mashup engine and configured to process location data of the client device and at least one other client device in the squad.

15. At least one computer-readable medium that is not a signal or carrier wave per se, the at least one computer-readable medium storing computer-executable instructions that, when executed by a server, cause the server to perform a method, comprising:

maintaining information representative of squads of devices, including a first squad and a second squad;

receiving data by which a device of the first squad is enabled to track movement of at least one device of the second squad, wherein at least a portion of the received data was previously obtained by at least one other client device of the first squad from a third-party service, and wherein the at least a portion of the received data is based on information that the third-party service previously received from the second squad; and providing the received data to the device of the first squad.

16. The at least one computer-readable medium of claim 15, the method further comprising:

receiving information indicating a mobility change in the first squad;

determining, in response to the receiving, an update frequency;

providing the update frequency to a device of the first squad;

receiving an update message from the first squad, wherein the update message comprises a status vector that aggregates a current position of each squad device;

receiving data corresponding to a mobility pattern of the squad;

predicting, based on the received data, a current location of the squad.

17. The at least one computer-readable medium of claim 15, the method further comprising, detecting a lack of a heartbeat corresponding to a device of the first squad, and, in response, removing the device from the first squad.

18. The at least one computer-readable medium of claim 15, the method further comprising:

receiving information that indicates a position of a device relative to a squad;

computing a distance relative to the squad based on the position of the device; and removing the device as a member of the squad in response to the distance exceeding a threshold distance.

* * * * *